US008868876B2

(12) United States Patent
Foster et al.

(10) Patent No.: US 8,868,876 B2
(45) Date of Patent: Oct. 21, 2014

(54) DEDICATED LARGE PAGE MEMORY POOLS

(75) Inventors: Alfred F. Foster, Wappingers Falls, NY (US); David Hom, Poughkeepsie, NY (US); Charles E. Mari, Wappingers Falls, NY (US); Matthew J. Mauriello, Fishkill, NY (US); Robert Miller, Jr., Poughkeepsie, NY (US); Mariama Ndoye, Poughkeepsie, NY (US); Michael G. Spiegel, Monroe, NY (US); Peter G. Sutton, Poughkeepsie, NY (US); Scott B. Tuttle, Staatsburg, NY (US); Elpida Tzortzatos, Lagrangeville, NY (US); Chun-Kwan K. Yee, Woodstock, NY (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/338,690

(22) Filed: Dec. 28, 2011

(65) Prior Publication Data
US 2013/0173880 A1 Jul. 4, 2013

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC ...................................... *G06F 12/02* (2013.01)
USPC .......................................................... 711/170

(58) Field of Classification Search
CPC ........................................................ G06F 12/02
USPC .......................................................... 711/170
See application file for complete search history.

(56) References Cited

U.S. PATENT DOCUMENTS

| 5,784,707 | A | 7/1998 | Khalidi et al. |
| 6,112,301 | A | 8/2000 | Johnson |
| 6,182,089 | B1 | 1/2001 | Ganapathy et al. |
| 6,202,134 | B1 | 3/2001 | Shirai |
| 6,311,257 | B1 | 10/2001 | Fitzgerald et al. |

(Continued)

FOREIGN PATENT DOCUMENTS

CN   101093455 A   12/2007

OTHER PUBLICATIONS

Brooker, Christopher G., et al., "Managing Storage Extents and the Obtaining of Storage Blocks within the Extents," U.S. Appl. No. 13/101,731, filed May 5, 2011.

(Continued)

*Primary Examiner* — Matthew Bradley
*Assistant Examiner* — Rocio Del Mar Perez-Velez
(74) *Attorney, Agent, or Firm* — William A. Kinnaman, Esq.; Kevin P. Radigan, Esq.; Heslin Rothenberg Farley & Mesiti P.C.

(57) ABSTRACT

Dedicated large page memory pools are provided to, at least in part, facilitate access to large pages. The large page memory is managed by: establishing multiple large page memory pools, each large page memory pool of the multiple large page memory pools including a number of large pages; and dedicating each large page memory pool of the multiple large page memory pools to a respective processor of multiple processors of the computing environment, wherein processors of the multiple processors can concurrently access pages from the respective large page memory pools of the multiple large page memory pools.

18 Claims, 8 Drawing Sheets

(56) References Cited

U.S. PATENT DOCUMENTS

| | | | |
|---|---|---|---|
| 6,360,303 | B1 | 3/2002 | Wisler et al. |
| 6,738,866 | B2 | 5/2004 | Ting |
| 6,889,307 | B1 | 5/2005 | Scheuerlein |
| 6,961,835 | B2 | 11/2005 | Lightstone et al. |
| 7,080,081 | B2 | 7/2006 | Agarwal et al. |
| 7,225,313 | B2 | 5/2007 | Mather et al. |
| 7,236,974 | B2 | 6/2007 | Bhattacharjee et al. |
| 7,336,675 | B2 | 2/2008 | Naik et al. |
| 7,437,529 | B2 | 10/2008 | Burugula et al. |
| 7,484,072 | B2 | 1/2009 | Hepkin et al. |
| 7,543,123 | B2 | 6/2009 | Evanchik et al. |
| 7,739,473 | B1 | 6/2010 | Nordquist |
| 7,765,211 | B2 | 7/2010 | Bhattacharjee et al. |
| 7,802,070 | B2 | 9/2010 | Cholleti et al. |
| 8,566,546 | B1 * | 10/2013 | Marshak et al. ............. 711/165 |
| 2005/0044310 | A1 * | 2/2005 | Cameron ..................... 711/112 |
| 2006/0004977 | A1 | 1/2006 | Jann et al. |
| 2007/0233722 | A1 | 10/2007 | Schacher et al. |
| 2009/0193212 | A1 | 7/2009 | Kodaka et al. |
| 2010/0106930 | A1 | 4/2010 | Foltz et al. |
| 2011/0087857 | A1 | 4/2011 | Bomma et al. |
| 2011/0119477 | A1 * | 5/2011 | Byun et al. ........................ 713/2 |
| 2011/0185139 | A1 * | 7/2011 | Inoue et al. ................... 711/165 |

OTHER PUBLICATIONS

Foster, Alfred F., et al., "Selecting an Auxiliary Storage Medium for Writing Data of Real Storage Pages," U.S. Appl. No. 13/101,725, filed May 5, 2011.

Foster, Alfred F. et al., "Managing Large Page Memory Pools", U.S. Appl. No. 13/101,735, filed May 5, 2011.

Foster, Alfred F. et al., "Managing Allocation of Memory Pools", U.S. Appl. No. 13/101,791, filed May 5, 2011.

Wang, Feng, "Storage Management in Large Distributed Object-Based Storage Systems", University of California, Dec. 2006.

Matyas, M. et al., "Reviersible Data Mixing Procedure for Efficient Public-Key Encryption," Oct. 1998.

Scheifler, Robert W., "X Window System Protocol, Version 11, Alpha Update," Jun. 1987.

Murray, Bill, "Mixing Formal and Dynamic Verification, Part 1," SCDsource 2007-2010, pp. 1-31 (no further date information available).

Khalidi, Yousef A., et al., "Virtual Memory Support for Multiple Pages," Sun Microsystems Laboratories, Inc., Sep. 1993, pp. 1-7.

Talluri, Madhusudan, et al., "Tradeoffs in Supporting Two Page Sizes," Jun. 1992, pp. 415-424.

"Intelligent and Automated Allocation/Re-allocation of Paging Space to Enhance the Overall Operating System Performance," IP.com number: IPCOM000153048D, May 2007, pp. 1-4.

Tian, Yi et al., "Efficient Data Placement and Replacement Algorithms for Multiple-Level Memory Hierarchy," Proc. 10th International Conference on Parallel and Distributed Computing Systems, Oct. 1998, pp. 196-201.

Beretvas, Thomas, "Paging Enhancements in VM/SP HPO," pp. 728-737, Dec. 1984.

Knox, Deborah, et al., "Disk Swapping in Paged Distributed Virtual Memory Systems," pp. 153-157, Oct. 1994.

IBM Technical Disclosure Bulletin, "Method and System to Charge CPU Processing Units to Client Partitions Based on the Utilization of Virtual I/O Operations," IPCOM000171482D, Jun. 2008, pp. 1-2.

Iolszewski, Bret R., et al., "Management of Low-Paging Space Conditions in an Operating System," U.S. Appl. No. 12/875,831, filed Sep. 3, 2010.

BM, "z/Architecture Principles of Operation", IBM Publication No. SA22-7832-08, Aug. 2010.

\* cited by examiner

DEDICATED LARGE PAGE MEMORY POOLS

BACKGROUND

One or more aspects of the present invention relate, in general, to managing memory of a computing environment, and in particular, to managing memory pools.

A computing environment may include main memory, as well as auxiliary storage, such as direct access storage devices (DASD). Main memory includes pages of memory that are backed by real storage, referred to as real storage frames. These pages are ready to be accessed by applications, instructions, operations, or other entities. Main memory is limited in space, and therefore, typically only the most recently used pages of memory are maintained in main memory. The other pages of memory are maintained in auxiliary storage.

Main memory includes a memory pool, referred to as a 4K memory pool, which includes 4K pages of memory to be allocated upon request. This pool is managed in order to service requests for pages of memory.

BRIEF SUMMARY

Main memory also includes, in accordance with an aspect of the present invention, one or more other memory pools that are to be managed.

The shortcomings of the prior art are overcome and additional advantages are provided through the provision of a computer program product for managing large page memory pools of a computing environment. The computer program product includes a storage medium readable by a processing circuit and storing instructions for execution by the processing circuit for performing a method. The method includes, for instance, establishing multiple large page memory pools, each large page memory pool of the multiple large page memory pools comprising a number of large pages; and dedicating each large page memory pool of the multiple large page memory pools to a respective processor of multiple processors of the computing environment, wherein processors of the multiple processors can concurrently access pages from the respective large page memory pools of the multiple large page memory pools.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, multiple dedicated large page (e.g., 1 M) memory pools are provided and managed. For instance, a large page transfer technique is provided to effectively manage the large page memory pools. The large page transfer technique is automatically triggered based on defined thresholds that enable proactive management of the pools. As an example, the thresholds are checked responsive to a request for one or more large pages, and based on the thresholds, large page transfer between dedicated large page memory pools may be performed.

Figure 1:
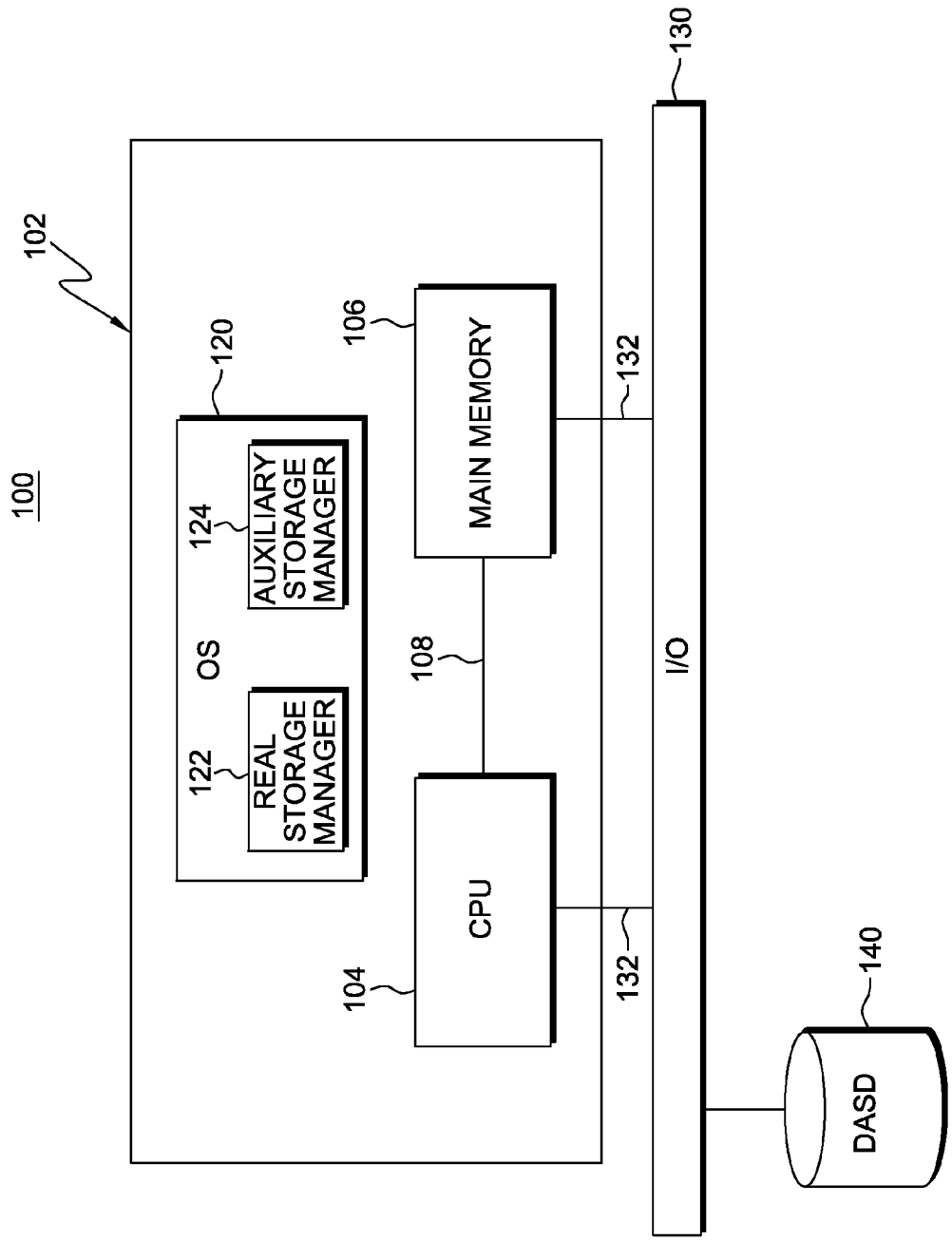
FIG. 1 depicts one example of a computing environment to incorporate and/or use one or more aspects of the present invention.

One embodiment of a computing environment to incorporate and/or use one or more aspects of the present invention is described with reference to FIG. 1. Computing environment 100 is based, for instance, on the z/Architecture® offered by International Business Machines Corporation, Armonk, N.Y. The z/Architecture® is described in an IBM® publication entitled, "z/Architecture Principles of Operation," IBM Publication No. SA22-7832-08, August 2010, which is hereby incorporated herein by reference in its entirety. In one example, a computing environment based on the z/Architecture® includes the zEnterprise 196 (z196) system, offered by International Business Machines Corporation, Armonk, N.Y. IBM® and z/Architecture® are registered trademarks, and zEnterprise 196 and z196 are trademarks of International Business Machines Corporation, Armonk, N.Y., USA. Other names used herein may be registered trademarks, trademarks or product names of International Business Machines Corporation or other companies.

As one example, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the z/OS® operating system offered by International Business Machines Corporation. In other examples, one or more of the central processing units may execute other operating systems or no operating system. z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem provides connectivity to one or more auxiliary storage media, including, for instance, one or more direct access storage devices (DASD) 140. In one particular example of the z/Architecture®, the I/O subsystem is a channel subsystem. However, the I/O subsystem may be other than a channel subsystem, and the auxiliary storage media may be other than or in addition to DASD.

Main memory and auxiliary storage are managed, in one example, by managers of operating system 120, including, for instance, a real storage manager 122 and an auxiliary storage manager 124. Real storage manager 122 is responsible for tracking the contents of main memory and managing the paging activities of main memory. Auxiliary storage manager 124 is responsible for tracking auxiliary storage and for working with the real storage manager to find locations to store real pages that are being paged-out from main memory.

One role of the real storage manager (RSM) is to manage the allocation of real memory page frames and to resolve references by the program to virtual memory pages that are not currently in real memory or do not yet exist (for example, first reference faults). The real storage manager maintains a free list of page frames that are available to satisfy page faults. This free list is referred to, for instance, as the Available Frame Queue (AFQ). Page frames are returned to the AFQ when storage is freed explicitly or implicitly when a program ends. In most environments, since the amount of virtual memory that is in use at any given instance may be larger than real memory, the system itself replenishes the AFQ. AFQ replenishment is driven by thresholds, such as AFQLOW and AFQOK, managed by a system resource manager (SRM) of the operating system. When the number of frames on the AFQ falls below AFQLOW, SRM calls the real storage manager to replenish the AFQ by removing some of the current page data from real memory. The system stops replenishing the AFQ when the AFQOK threshold is reached. The process of selecting which pages to displace from main memory and page them out to auxiliary storage is called page replacement. Page replacement in z/OS® is accomplished, in one example, by implementing a least recently used technique.

Requests that are received for real memory pages may be for small pages (e.g., 4K pages) or large pages (e.g., 1 M pages). To sustain the benefits of large pages, it is better that the operating system pages very little and it is best when the operating system does not page at all. To this end, a page transfer technique is provided, in accordance with an aspect of the present invention, specifically for large page pool management. This technique is proactive in that the number of pages in a specified large page memory pool is checked earlier than the indications provided by SRM and the AFQLOW and AFQOK thresholds described above, and action is taken, if indicated.

Figure 2:
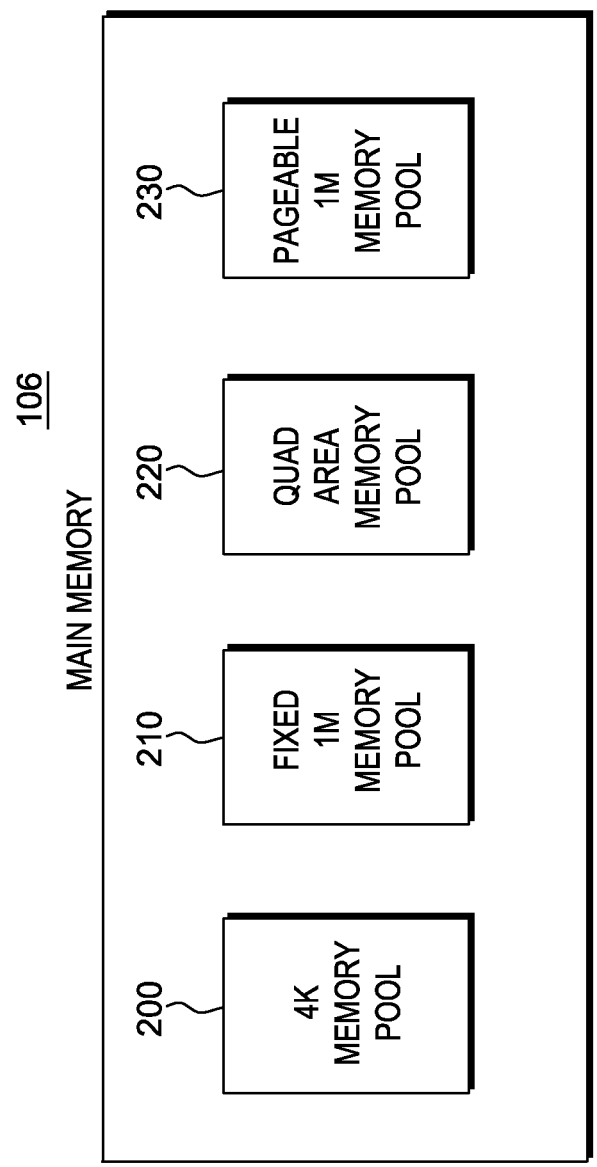
FIG. 2 depicts examples of memory pools in main memory, in accordance with an aspect of the present invention.

A memory pool includes a plurality of page frames of a particular size. In one example, main memory 106 includes a plurality of memory pools, as depicted in FIG. 2. For example, main memory 106 includes a 4K memory pool 200 used to satisfy requests (e.g., from the operating system and applications) for 4K page frames (a frame is the real memory backing the requested page); a fixed 1 M memory pool 210 used to satisfy requests for 1 M fixed large page frames; a quad area memory pool 220 used to manage four contiguous 4K frames in physical memory; and in accordance with an aspect of the present invention, a pageable 1 M memory pool 230 used to service pageable 1 M page frame requests.

Figure 3:
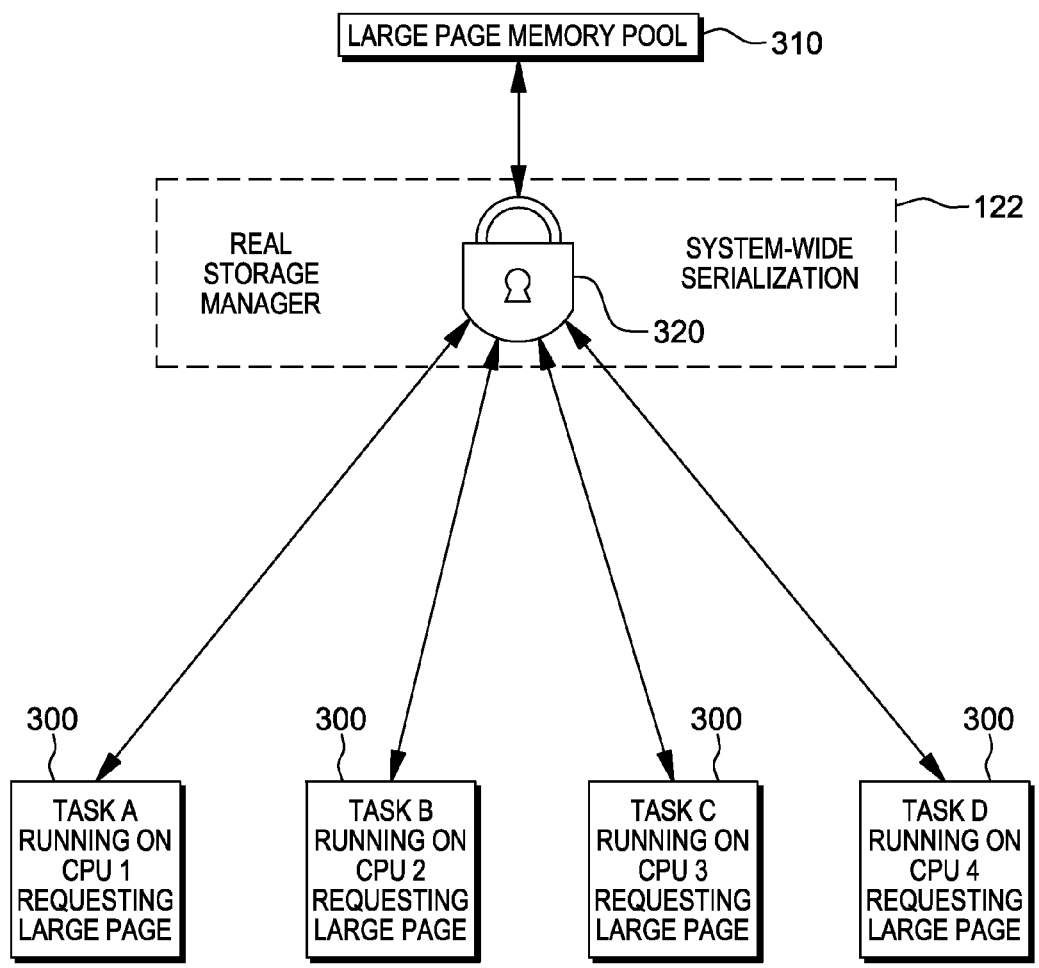
FIG. 3 depicts one embodiment of managing access to a large page memory pool, in accordance with one or more aspects of the present invention.

In one approach, when a page request is received for a large page frame, the large page memory pool is serialized using a global system lock to prevent pool corruption when multiple tasks running on multiple processors are simultaneously performing large page requests. By way of example, FIG. 3 depicts a computing environment comprising multiple processors (e.g., central processing units (CPUs)) 300, which have respective tasks (task A, task B, task C & task D) executing thereon that are concurrently requesting one or more large pages from a common large page memory pool. In one embodiment, the real storage manager 122 of the computing environment serializes these large page requests via a global lock 320. The disadvantage of this approach is that serialization delays may occur if two or more tasks running on different processors are simultaneously or concurrently making large page request. In such a case, each task is competing for the same global lock 320. Thus, one task will obtain the lock, and have its large page request concurrently processed, and the other task(s) will need to wait until the task holding the global lock completes.

One approach to reducing serialization delays is to divide the large page memory pool (whether the fixed 1 M memory pool or the pageable 1 M memory pool) into multiple large page memory pools, with each large page memory pool comprising a number of large pages, and dedicating each pool to a respective processor of the multiple processors within the computing environment. With such an approach, two or more processors can concurrently access pages from their respective, dedicated large page memory pools.

More particularly, in one embodiment, multiple equally-sized, dedicated large page (e.g., 1 M) memory pools may be established, each dedicated to a particular processor on the computing system. In such a system, the need for a global system lock to manage access to the common or global large page memory access pool (of FIG. 3) is eliminated. With the approach disclosed herein, multiple tasks can simultaneously perform large page requests, without any serialization bottleneck.

Figure 4:
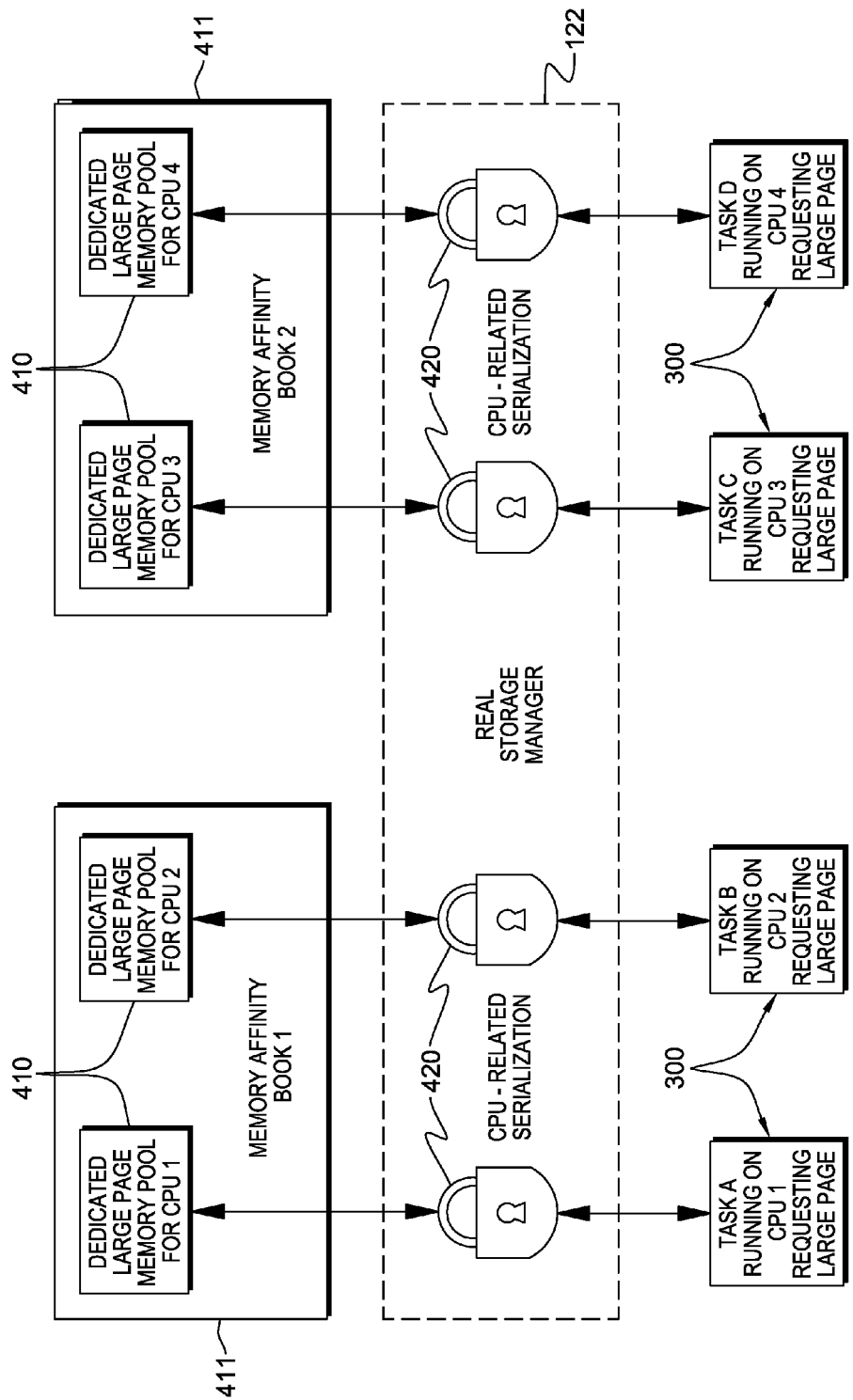
FIG. 4 depicts one embodiment of managing access to multiple dedicated large page memory pools, in accordance with one or more aspects of the present invention.

One embodiment of this concept is depicted in FIG. 4, wherein the computing environment is shown to comprise multiple processors 300, each with a respective task (task A, task B, task C & task D) running thereon, requesting a large page. In this configuration, the computing environment comprises multiple, dedicated large page memory pools 410, each of which is associated with or dedicated to a particular processor. Thus, real storage manager 122 manages access to the large pages employing processor-related serialization 420 for each respective, dedicated large memory pool 410. Additionally, multiple memory affinity books 411 may be defined, each comprising two or more dedicated large memory pools 410, and employed in managing page transfer between pools, as explained further below.

By way of specific example, instead of employing one large page memory pool (for example, containing n times X large pages), n dedicated large page memory pools may be established, wherein n equals (in one embodiment) the number or processors defined to the system. In the example of FIG. 4, four dedicated large page memory pools are established, each dedicated to a respective processor of the four processors illustrated. Initially, each dedicated large page memory pool is established with, for example, an equal number of large pages (for example, each dedicated large page memory pool may comprise X large pages at initial program load (IPL)).

With dedicated large page memory pools, there is a significantly reduced chance of serialization bottlenecks. Each processor has its own dedicated large page memory pool, which will be tapped when a task running on that processor makes a large page request. This can be accomplished by employing a processor-related serialization approach within the real storage manager for managing large page requests. Thus, in one embodiment, only when a particular processor's dedicated large page memory pool becomes exhausted of large pages, will there be a need for additional serialization to occur to, for example, manage transfer of large pages between dedicated large page memory pools.

One embodiment of a more proactive management logic is described below with reference to FIGS. 5A-5C. In one example, the real storage manager performs this logic responsive to receipt of a request for a large (1 M) page frame.

Figure 5A:
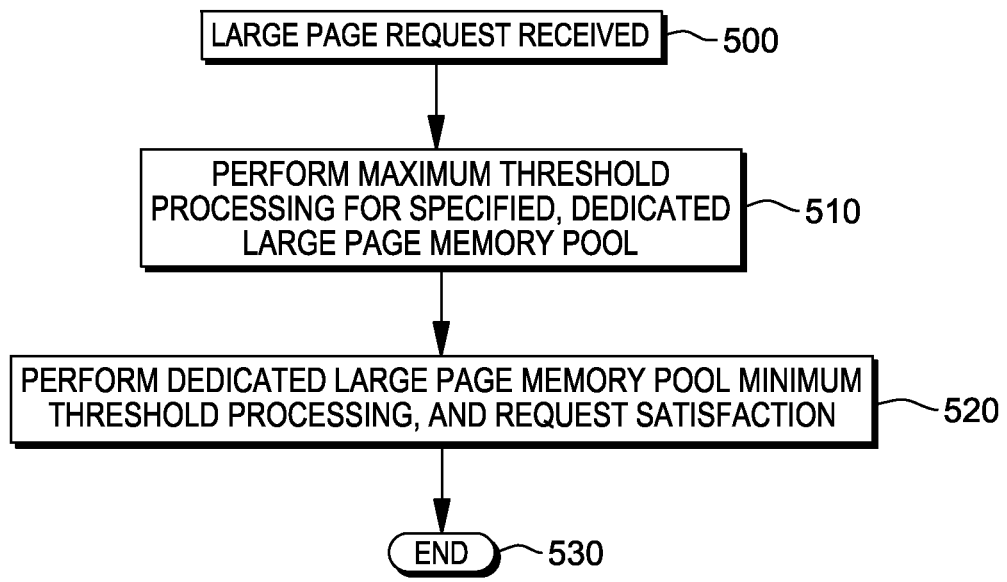
FIG. 5A depicts one embodiment of logic for managing pages within multiple large page memory pools, responsive to a request for one or more large pages (e.g., one or more 1 M page frames), in accordance with one or more aspects of the present invention.
Figure 5B:
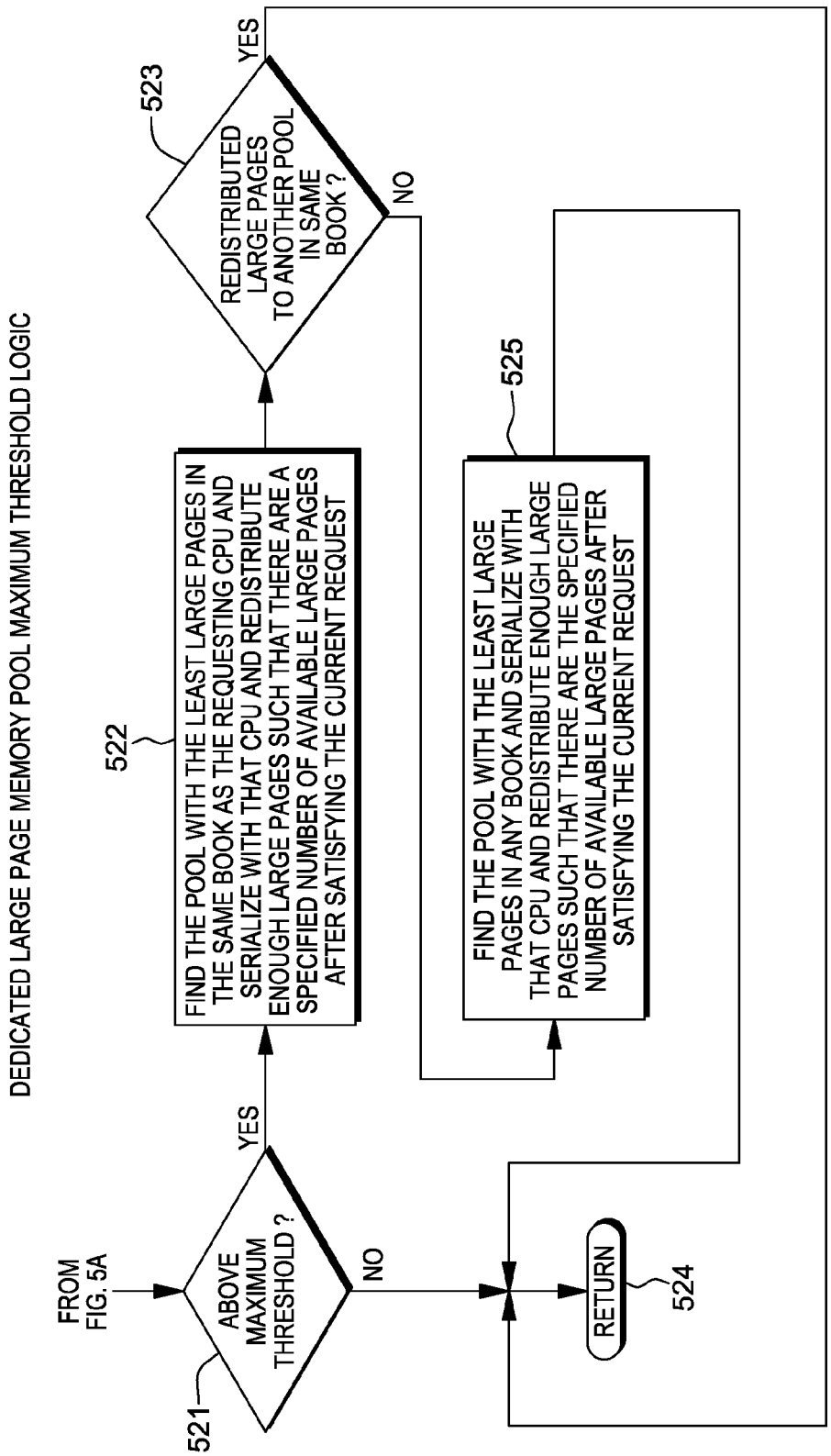
FIG. 5B depicts one embodiment of logic to perform maximum threshold processing for a specified, dedicated large page memory pool, in accordance with one or more aspects of the present invention.

Referring to FIG. 5A, responsive to the real storage manager receiving a request for a 1 M page of real memory (e.g., due to a page fault), STEP 500, the real page manager performs for the specified (or target), dedicated large page memory pool, maximum threshold processing, STEP 510, one embodiment of which is depicted in FIG. 5B. Thereafter, the real storage manager performs, for the specified, dedicated large page memory pool, minimum threshold processing and request satisfaction, STEP 520, as illustrated (in one embodiment) in FIG. 5C, which completes the dedicated large page memory pool page management, in accordance with one or more aspects of the present invention, STEP 530.

As noted, FIG. 5B depicts one embodiment of maximum threshold processing for the specified (or target), dedicated large page memory pool. Initially, the real storage manager determines whether the current number of large pages in the specified large page memory pool is above a maximum threshold 521 (such as the number of the initially-allocated pages), and if "yes", the manager identifies a dedicated large page memory pool with a least number of pages in the same memory affinity book as the specified, dedicated large page memory pool (i.e., in the same memory book affinity as the requesting processor), STEP 522. Logic then serializes on that processor, and returns enough large pages so that there will be a specified number (e.g., X) available large pages in the specified, dedicated large page memory pool after the current page request is satisfied. Thereafter, the real storage manager inquires whether any large pages were redistributed to any dedicated large page memory pool in the same memory affinity book, INQUIRY 523, and if "yes", processing returns, STEP 524.

If no dedicated large page memory pool in the same memory affinity book is below 100% of its large page capacity, then the real storage manager identifies the dedicated large page memory pool with the least number of large pages in any memory affinity book, and serializes on the associated processor, and transfers enough large pages so that there will be the specified number of large pages in the specified, dedicated large page memory pool after satisfying the current page request, STEP 525. Thereafter, or if the number of large pages in the specified, dedicated large page memory pool is at or below the maximum threshold, the logic returns, STEP 524.

Figure 5C:
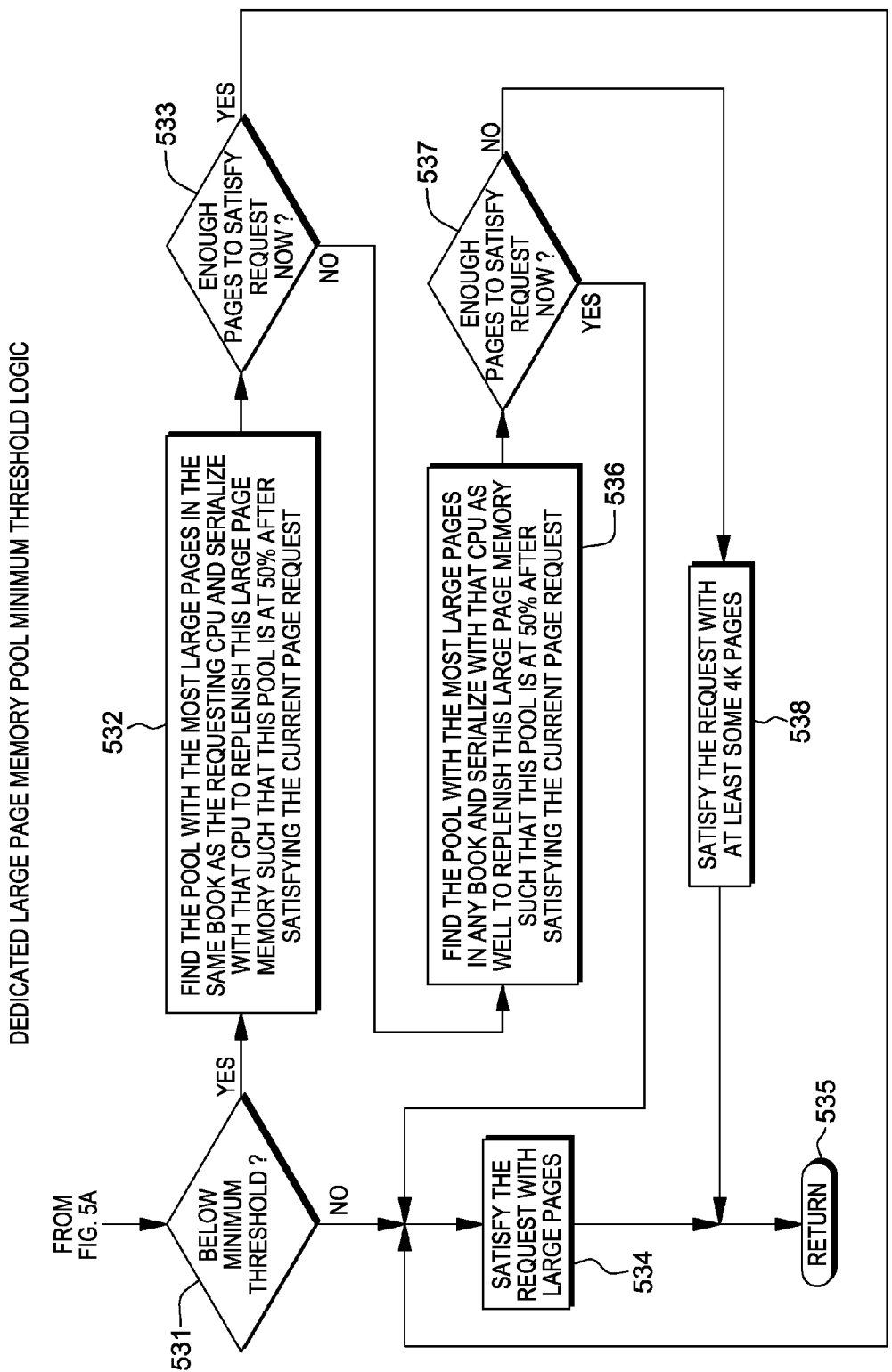
FIG. 5C depicts one embodiment of logic to perform dedicated large page memory pool minimum threshold processing, and request satisfaction, in accordance with one or more aspects of the present invention.

As noted, after completing maximum threshold processing for the specified, dedicated large page memory pool, the real storage manager performs minimum threshold processing for the pool, and request satisfaction, one embodiment of which is depicted in FIG. 5C. Initially, the real storage manager determines whether the number of large pages in the specified, dedicated large page memory pool is below a minimum threshold (such as a % of the initially-allocated pages) 531, and if "yes", then the manager identifies a dedicated large page memory pool with the most large pages in the same memory affinity book as the specified, dedicated large page memory pool (i.e., the same memory book affinity as the requesting processor), STEP 532. Logic then serializes on that processor, and transfers enough large pages to the specified, dedicated large page memory pool, so that the specified pool will be at a specified level (e.g., 50%) after satisfying the current page request. Thereafter, the real storage manager inquires whether enough pages were transferred to the specified, dedicated large page memory pool to satisfy the page request, STEP 533, and if "yes", then the page request is satisfied with large pages from the specified, dedicated large page memory pool, STEP 534, after which processing returns, STEP 525.

If there are insufficient pages to satisfy the current page request, then from INQUIRY 533, the manager locates the dedicated large page memory pool with the most large pages in any book in the computing environment, and serializes on the associated processor to replenish the specified, dedicated large page memory pool, so that the specified pool will be at the specified level (e.g., 50%) after satisfying the current page request, STEP 536. The real storage manager then inquires whether there are enough large pages in the specified pool to satisfy the current page request 537, and if "yes", then the manager satisfies the page request with large pages from the specified, dedicated large page memory pool 534. Otherwise, the manager satisfies the request employing pages from the specified pool, as well as at least some small pages (4K page frames) from a small page memory pool (see FIG. 2), STEP 538, after which the logic returns, STEP 535.

Additional information relating to main memory and managing large page memory pools is provided in the following, commonly assigned applications, each of which is incorporated herein by reference in its entirety: "Managing Large Page Memory Pools", U.S. Ser. No. 13/101,735, filed May 5, 2011, by Foster et al.; and "Managing Allocation of Memory Pools", U.S. Ser. No. 13/101,791, filed May 5, 2011, by Foster et al.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
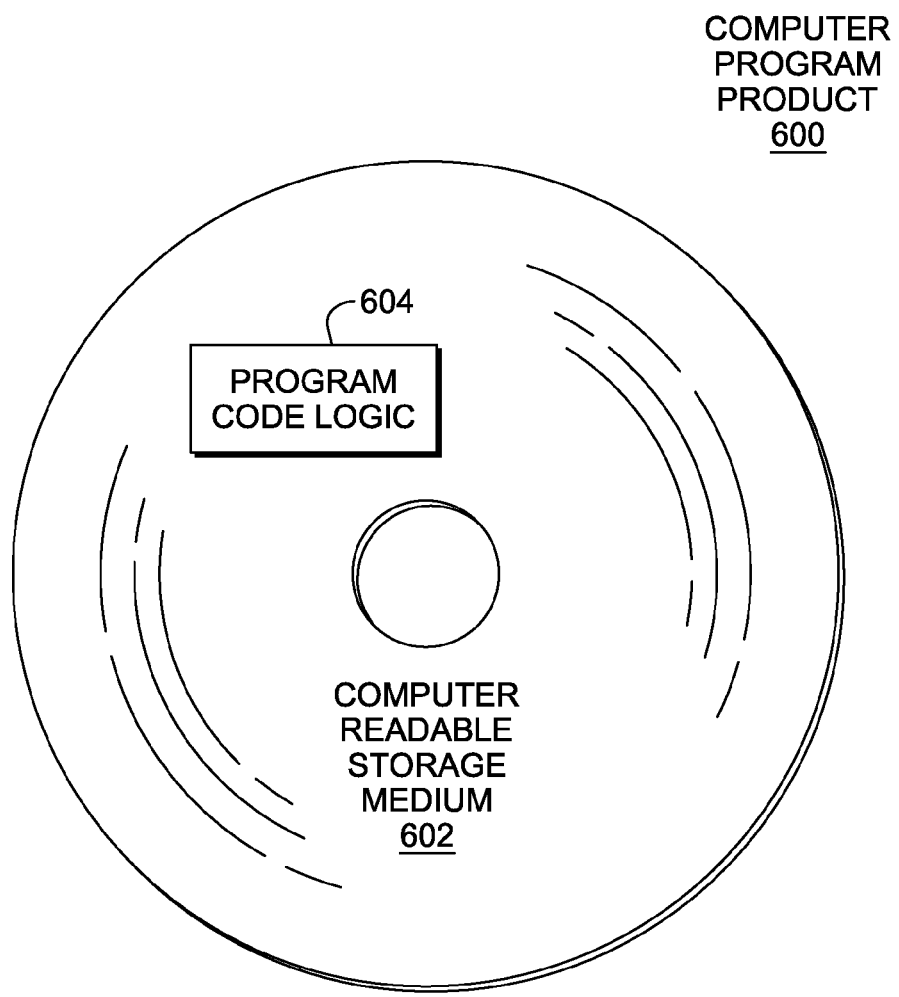
FIG. 6 depicts one embodiment of a computer program product to incorporate one or more aspects of the present invention.

Referring now to FIG. 6, in one example, a computer program product 600 includes, for instance, one or more non-transitory computer readable storage media 602 to store computer-readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, although examples of auxiliary storage are described herein, other types of auxiliary storage may be used without departing from the spirit of the present invention. Further, other considerations may be used to determine when or how to manage the large page pools. Further, pools other than large page pools may be managed, in accordance with an aspect of the present invention. Yet further, other threshold values and/or percentages may be used.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for managing large page memory pools of a computing environment, the computer program product comprising:
   a computer-readable storage medium readable by a processing circuit and storing instructions for execution by the processing circuit for performing a method comprising:
      establishing multiple large page memory pools, each large page memory pool of the multiple large page memory pools comprising a number of large pages;
      dedicating each large page memory pool of the multiple large page memory pools to a processor of multiple processors of the computing environment, wherein each processor of the multiple processors can concurrently access pages from a dedicated large page memory pool;
      receiving a page request for one or more large pages from a specified large page memory pool of the multiple large page memory pools;
      evaluating the number of pages in the specified large page memory pool; and
      responsive to the evaluating, transferring pages between at least two large page memory pools of the multiple large page memory pools, wherein the specified large page memory pool is one of the at least two large page memory pools.

2. The computer program product of claim 1, wherein the evaluating comprises determining that the number of large pages in the specified large page memory pool is above the maximum threshold, and the transferring comprises transferring pages from the specified large page memory pool to another large page memory pool of the at least two large page memory pools, so that after satisfying the page request, the number of pages in the specified large page memory pool will be at a specified level.

3. The computer program product of claim 2, wherein the dedicating further comprises dividing the multiple large page memory pools into multiple memory affinity books, each memory affinity book comprising at least two large page memory pools of the multiple large page memory pools, and wherein the another large page memory pool is part of a same memory affinity book as the specified large page memory pool.

4. The computer program product of claim 2, wherein wherein the another large page memory pool currently comprises a least number of large pages.

5. The computer program product of claim 1, wherein the evaluating comprises determining that the number of large pages in the specified large page memory pool is below the minimum threshold, and the transferring comprises transferring pages from another large page memory pool of the at least two large page memory pools to the specified large page memory pool, so that after specifying the page request, the number of pages in at least one of the specified large page memory pool or the another large page memory pool will be at a specified level.

6. The computer program product of claim 5, wherein the dedicating further comprises dividing the multiple large page memory pools into multiple memory affinity books, each memory affinity book comprising at least two large page memory pools of the multiple large page memory pools, and wherein the another large page memory pool is part of a same memory affinity book as the specified large page memory pool.

7. The computer program product of claim 6, wherein the method further comprises determining whether, after transferring pages from the another large page memory pool in the same memory affinity book to the specified large page memory pool, the specified large page memory pool contains sufficient large pages to satisfy the page request, and responsive to the specified large page memory pool possessing insufficient large pages to satisfy the page request, identifying a further large page memory pool of the multiple large page memory pools having the most large pages, and transferring large pages from the further large page memory pool to the specified large page memory pool.

8. The computer program product of claim 7, further comprising, after transferring large pages from the further large page memory pool to the specified large page memory pool, determining whether the specified large page memory pool contains a sufficient number of large pages to satisfy the page request, and responsive to the specified large page memory pool having an insufficient number of large pages to satisfy the page request, satisfying the page request with, at least in part, multiple small pages from at least one small page memory pool of the computing environment.

9. The computer program product of claim 8, wherein each large page comprises a 1 M page frame, and each small page comprises a 4K page frame.

10. A computer system for managing large page memory pools of a computing environment, the computer system comprising:
   a memory; and
   a processor in communications with the memory, wherein the computer system is configured to perform:
      establishing multiple large page memory pools, each large page memory pool of the multiple large page memory pools comprising a number of large pages;
      dedicating each large page memory pool of the multiple large page memory pools to a processor of multiple processors of the computing environment, wherein each processor of the multiple processors can concurrently access pages from a dedicated large page memory pool;
      receiving a page request for one or more large pages from a specified large page memory pool of the multiple large page memory pools;
      evaluating the number of pages in the specified large page memory pool; and
      responsive to the evaluating, transferring pages between at least two large page memory pools of the multiple large page memory pools, wherein the specified large memory pool is one of the at least two large page memory pools.

11. The computer system of claim 10, wherein the evaluating comprises determining that the number of large pages in the specified large page memory pool is above the maximum threshold, and the transferring comprises transferring pages from the specified large page memory pool to another large page memory pool of the at least two large page memory pools, so that after satisfying the page request, the number of pages in the specified large page memory pool will be at a specified level.

12. The computer system of claim 11, wherein the dedicating further comprises dividing the multiple large page memory pools into multiple memory affinity books, each memory affinity book comprising at least two large page memory pools of the multiple large page memory pools, and wherein the another large page memory pool is part of a same memory affinity book as the specified large page memory pool.

13. The computer system of claim 10, wherein the evaluating comprises determining that the number of large pages in the specified large page memory pool is below the minimum threshold, and the transferring comprises transferring pages from another large page memory pool of the at least two large page memory pools to the specified large page memory pool, so that after specifying the page request, the number of pages in at least one of the specified large page memory pool or the another large page memory pool will be at a specified level.

14. The computer system of claim 13, wherein the dedicating further comprises dividing the multiple large page memory pools into multiple memory affinity books, each memory affinity book comprising at least two large page memory pools of the multiple large page memory pools, and wherein the another large page memory pool is part of a same memory affinity book as the specified large page memory pool.

15. The computer system of claim 14, wherein the method further comprises determining whether, after transferring pages from the another large page memory pool in the same memory affinity book to the specified large page memory pool, the specified large page memory pool contains sufficient large pages to satisfy the page request, and responsive to the specified large page memory pool possessing insufficient large pages to satisfy the page request, identifying a further large page memory pool of the multiple large page memory pools having the most large pages, and transferring large pages from the further large page memory pool to the specified large page memory pool.

16. The computer system of claim 15, further comprising, after transferring large pages from the further large page memory pool to the specified large page memory pool, determining whether the specified large page memory pool contains a sufficient number of large pages to satisfy the page request, and responsive to the specified large page memory pool having an insufficient number of large pages to satisfy the page request, satisfying the page request with, at least in part, multiple small pages from at least one small page memory pool of the computing environment.

17. A method of managing large page memory pools of a computing environment, the method comprising:
   establishing multiple large page memory pools, each large page memory pool of the multiple large page memory pools comprising a number of large pages;
   dedicating each large page memory pool of the multiple large page memory pools to a processor of multiple processors of the computing environment, wherein each processor of the multiple processors can concurrently access pages from a dedicated large page memory pool;

receiving a page request for one or more large pages from a specified large page memory pool of the multiple large page memory pools;

evaluating the number of pages in the specified large page memory pool; and responsive to the evaluating, transferring pages between at least two large page memory pools of the multiple large page memory pools, wherein the specified large memory pool is one of the at least two large page memory pools.

18. The method of claim 17, wherein the evaluating comprises determining that the number of large pages in the specified large page memory pool is above a maximum threshold or below a minimum threshold, wherein responsive to determining that the number of pages is above the maximum threshold, the transferring comprises transferring pages from the specified large page memory pool to another large page memory pool of the at least two large page memory pools, so that after satisfying the page request, the number of pages in the specified large page memory pool will be at a specified level, and wherein responsive to determining that the number of pages is below the minimum threshold, the transferring comprises transferring pages from the another large page memory pool to the specified large page memory pool, so that after specifying the page request, the number of pages in at least one of the specified large page memory pool or the another large page memory pool will be at a specified level.

* * * * *